United States Patent

Smith et al.

(10) Patent No.: US 6,879,931 B2
(45) Date of Patent: Apr. 12, 2005

(54) SYSTEM AND METHOD FOR PROTECTION OF EQUIPMENT DURING MOTION ANOMALIES

(75) Inventors: Kevin H. Smith, Roseville, CA (US); Andrew H. Dickson, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 10/264,194

(22) Filed: Oct. 3, 2002

(65) Prior Publication Data

US 2004/0068388 A1 Apr. 8, 2004

(51) Int. Cl.[7] .................. G01C 17/00; G01C 19/00; G01C 9/00; G06F 15/00
(52) U.S. Cl. ................... 702/150; 714/47; 714/15; 714/1; 714/2; 714/37; 711/162; 711/161; 711/154
(58) Field of Search .................. 702/150; 714/47, 714/15, 1, 2, 37; 711/162, 161, 154

(56) References Cited

U.S. PATENT DOCUMENTS

| 5,631,852 | A | | 5/1997 | Chen |
|---|---|---|---|---|
| 5,835,885 | A | | 11/1998 | Lin |
| 6,082,623 | A | | 7/2000 | Chang |
| 6,266,579 | B1 | * | 7/2001 | Baraty ................. 700/275 |
| 6,286,106 | B1 | * | 9/2001 | Flannery ............... 713/310 |
| 6,496,949 | B1 | * | 12/2002 | Kanevsky et al. ........ 714/47 |
| 6,518,878 | B1 | * | 2/2003 | Skoff ..................... 340/506 |
| 6,661,346 | B1 | * | 12/2003 | Wood et al. ............. 340/601 |
| 6,684,306 | B1 | * | 1/2004 | Nagasawa et al. ....... 711/162 |

FOREIGN PATENT DOCUMENTS

| JP | 57020827 A | * | 2/1982 | ........... G06F/1/00 |
|---|---|---|---|---|
| JP | 57020828 A | * | 2/1982 | ........... G06F/1/00 |
| JP | 57211626 A | * | 12/1982 | ........... G06F/1/00 |

* cited by examiner

*Primary Examiner*—John Barlow
*Assistant Examiner*—Anthony T. Dougherty

(57) ABSTRACT

A system and method for determining motion anomalies that would affect the proper operation of a computer and, upon receipt of a determined high motion anomaly, causing certain data to be saved within a storage device in a file location appropriate for such data.

25 Claims, 2 Drawing Sheets

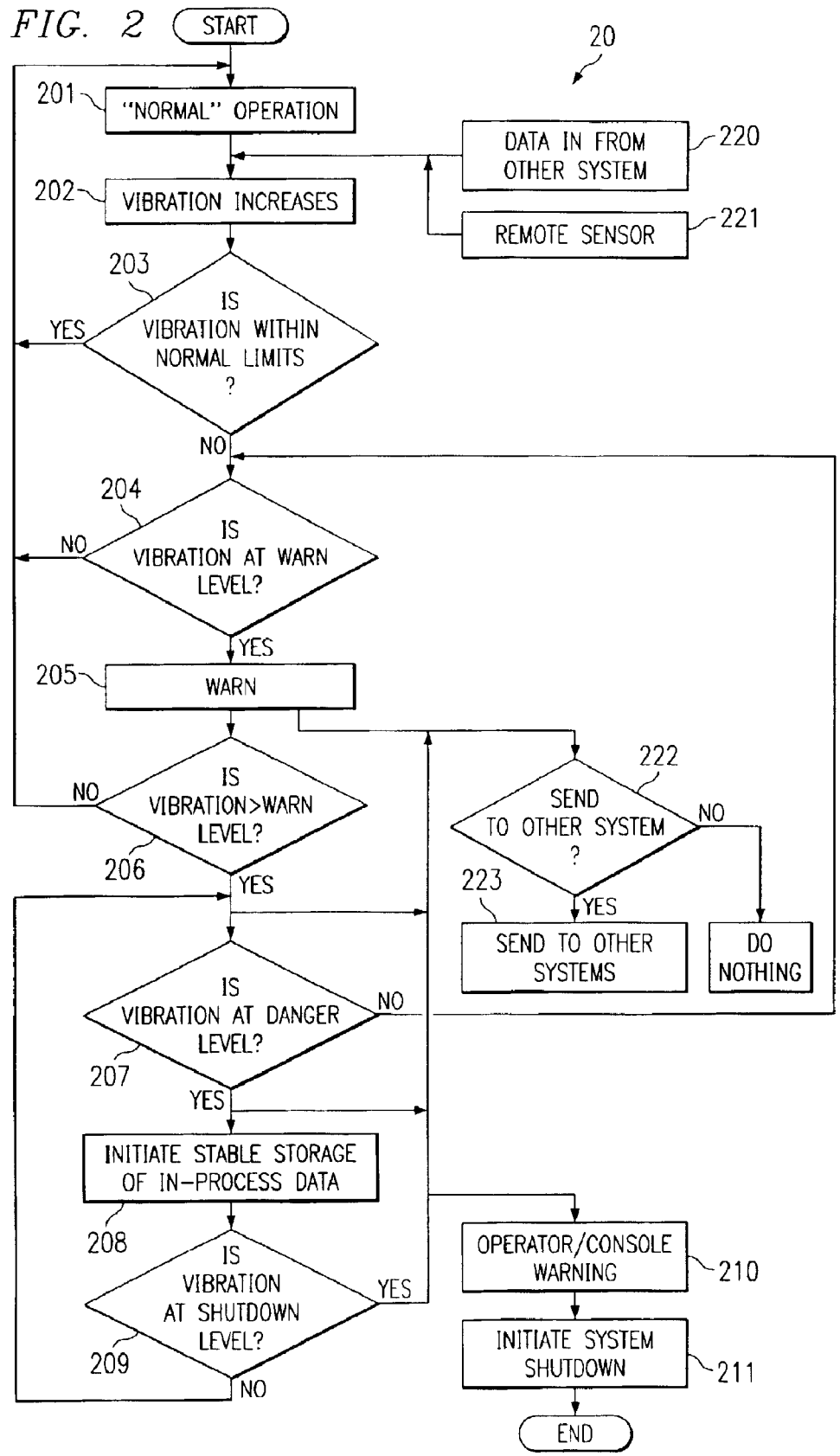

SYSTEM AND METHOD FOR PROTECTION OF EQUIPMENT DURING MOTION ANOMALIES

FIELD OF THE INVENTION

This invention relates to computer protection systems and methods and more particularly to such systems and methods which allow for the safe protection of currently active files during motion anomalies.

BACKGROUND OF THE INVENTION

In computer systems, there is always the possibility of a seismic event, or motion anomaly, such as a motion and/or acceleration condition. Such seismic conditions can occur because of external forces such as earthquakes, or they may occur due to other events that cause motion, shock, or acceleration internal to the computer housing.

Regardless of how the seismic event occurs, the results can be devastating to data being worked on by the computer. In a typical scenario, an earthquake occurs and exceeds the operational limits of the computer. If the computer continues to operate during the seismic event, data loss and damage to internal components can occur. In this event, data that has not been stored is either lost or stored in a temporary file which then must be recovered when the system is restarted.

Currently, the computer can not sense that excessive motion or a seismic event is occurring. Usually, the computer operator is unaware of the onset of a seismic event or motion that is about to exceed the operational limit of the computer.

BRIEF SUMMARY OF THE INVENTION

A computer system has incorporated therein at least one sensor for determining seismic events, such as, for example, motion, shock and high acceleration fault conditions that would affect the proper operation of the computer. Upon a determined seismic event, certain data is saved within a storage device in a file location appropriate for such data. If desired, the stored data, as well as any other data from the computer, can be saved at a location remote from the computer.

BRIEF DESCRIPTION OF THE DRAWINGS

FIG. 2 shows a flow chart of one embodiment of the invention.

DETAILED DESCRIPTION OF THE INVENTION

Figure 1:
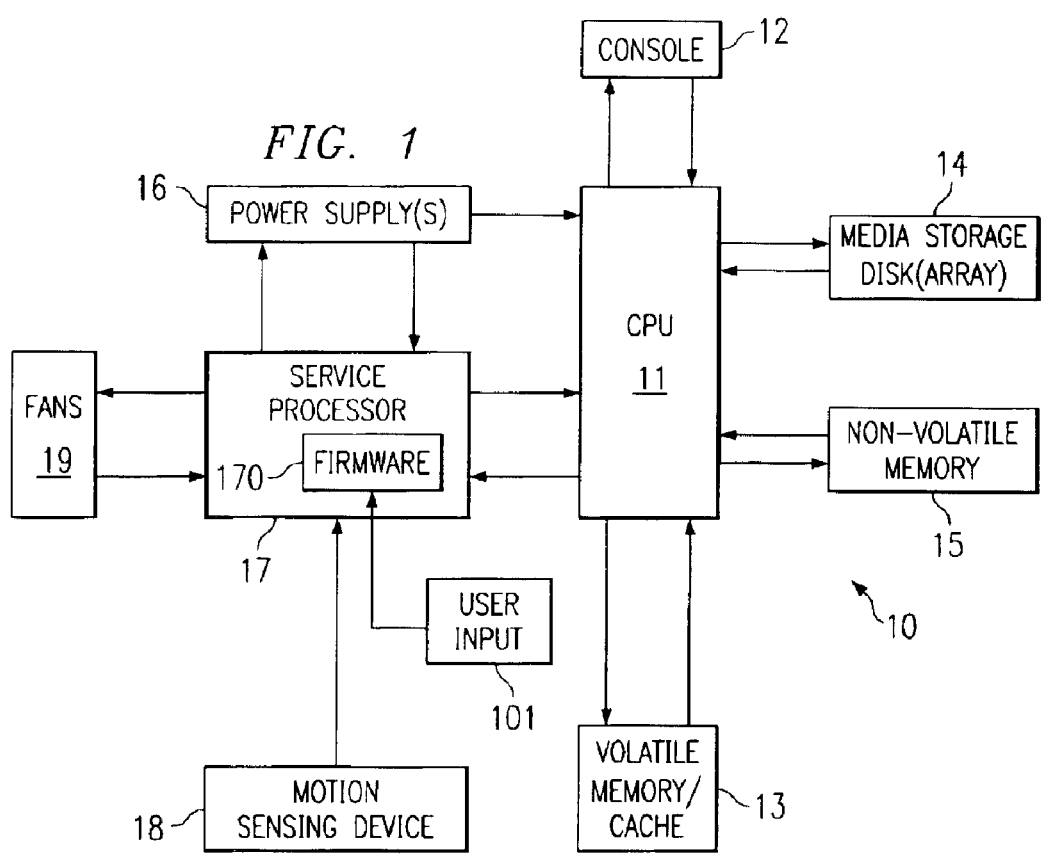
FIG. 1 shows one embodiment of the invention.

Turning now to FIG. 1 there is shown representative computer system 10, which includes CPU 11, console 12, volatile memory/cache 13, media storage 14, non-volatile memory 15, one or more power supplies 16, service processor 17, which includes therein firmware 170, and motion sensing device 18.

It is noted this is a representative system and the invention could be utilized in any type of computer system, whether it be within a single housing or several housings. Also, the various portions of system 10, such as CPU 11, console 12 and memory storage 13, 14, 15, or any of the other portions, could be spread over several systems, either contained at the same location or remoted together via a network connection, such as the Internet, T1, T3 or even a wireless interconnection or other data communication techniques between different units.

Service processor 17 in the system shown is utilized to perform various functions on the operation of the system while main processor CPU 11 is processing data for one or more applications. Service processor 17, controlled in part by firmware 170, monitors various functions, for example, it can monitor the vibration, or other motion anomalies, as provided by motion sensing device 18. Service processor 17 also monitors power supply(ies) 16 and could serve to control fans 19. User input 101 can be used, if desired, to set and change sensor levels; for example, as will be discussed with respect to boxes 203, 204, 206, 207 and 209 of FIG. 2. User input 101 can also provide, if desired, the motion levels outside the computer as a basis for comparison.

Motion sensing device 18 could be one or more transducers that pick up the actual motion level, or shock level or detect the rate of acceleration directly. If desired, the system and method of this invention could be run, in whole or in part, in CPU 11 directly, or could be run in whole or in part by firmware 17 or by software, if desired. Motion sensing device 18 could be remote from the CPU and such remote device could provide an 'early warning' system such that upon detection of motion anomalies remote from the CPU, the CPU can begin to shut down early. Since earthquake moves travel at 2–4 miles per second this would allow for early action to be taken to protect data. One such action could be a backup, or a save, of data more often than normal at the first indication of a remote motion anomaly. For example, in the 1989 California earthquake, a sensor in San Jose would have provided at least a 10 second warning to a computer located in San Francisco. This remote sensor could be a stand-alone sensor, or it could be a sensor working in cooperation with a sensor local to a CPU, or the sensors would be networked (either by wire line or wirelessly). This network could be a LAN, the Internet, or any other system which would take the motion anomaly data and broadcast that data to other systems. The other systems could be, for example, other computer systems or a central control point. In operation, this would require a small software or firmware program to transmit and/or receive such motion anomaly data to/from other systems.

As will be discussed, when the seismic event reaches a pre-determined level, action will be taken to store in-process data in a proper non-volatile memory 14 or 15. In-process data could be defined as all (or a portion) of the data that is outside of a non-volatile memory. Or it can be defined as all of the data, at the time of the detected trouble condition, not in a certain memory device. The system can be designed to select one or more storage devices, some of which could be located remotely from the trouble site. The data could be stored in multiple such devices, if desired, and the selection could be based on the source, and/or the intensity of the level of motion, shock, or high acceleration.

During normal operation of the computer, CPU 11 causes one or more applications to be loaded into its active memory, for example, volatile memory/cache 13. CPU 11 would receive data, perhaps via console 12, or from other sources not shown, and would work on this data in accordance with a then active information. During processing, this data is sometimes stored in storage 14, 15, but most often stored in volatile memory/cache 13.

When a motion fault condition occurs, as will be discussed with respect to FIG. 2, several actions are taken under control of, in this embodiment, service processor 17 and firmware 170. These actions culminate with the in-process data being stored in a non-volatile (and ideally in a motion resistant) memory, such as memory 14 or 15. Under some conditions, CPU 11, as well as the rest of the equipment including power supply 16, fans 19 will be turned off to preserve their integrity for later use.

Turning to FIG. 2, there is shown one embodiment 20 that starts with normal computer operation 201. As the motion/acceleration level increases, process 202, under control of motion sensing device 18, or remotely from another system, box 220, or from a remote sensor, box 221, working in conjunction with service processor 17 in the embodiment of FIG. 1, a decision, box 203, will be made to determine if the motion is within the normal limits. If it is, the operation continues. Motion monitoring can be combined, or can be periodic, as desired. If at any time the motion/acceleration is not within normal limits, then the determination is made, via decision box 204, as to whether the motion is at the warn level, if not, the system continues operating.

When operation 204 determines that the motion/acceleration has risen (or will rise) to a certain limit, a message (or other signal) is sent, box 205, to the user in one of various ways. A message can be put on the screen, or a message can be sent by wireline or wireless, including e-mail, to a user to warn the user that there is an impending problem. The message could be sent, as above-discussed, to another system, via boxes 222 and 223, if desired.

When the motion/acceleration moves above the warning level, decision box 206, a decision will then be made as to when the motion is at the danger level, decision box 207. Until the motion/acceleration is at the danger level, the system continues to monitor the motion level, provide warnings (including, if desired, the actual current level of motion, shock, or acceleration) to the user, but no further action is taken.

Once the motion, shock or acceleration level rises to the danger level, then the system initiates a stable storage of the in-process data via procedure 208. The system continues to monitor the motion/acceleration and at the point when the motion level rises to a level where a shut-down must occur, decision box 209, such system shut-down is undertaken. When that occurs, the user is given a warning, via warning 210, similar to the warning previously given, but, at this time, the warning indicates to the user that the system is going to be shut down. Process 211 initiates the system shut-down so as to preserve the integrity of the system. As shown in FIG. 2, data can be sent to one or more other systems at various times to help control those systems.

Note that prior to this time, the in-process data had been stored in a non-volatile memory. This memory can be located within the housing, which is preferable, on a hard drive, alternatively the data can be transmitted to a remote location via the Internet or other means, including wireless connections. The stored data could include, not only the in-process data, but certain other data that is desired to be preserved, based upon either the motion's rate of rise or the fact that there is a fault condition that has occurred.

What is claimed is:

1. A computer system including:
    a sensor for determining motion anomaly conditions that would affect the proper operation of said computer system;
    a storage device; and
    a processor operable upon a determined motion anomaly condition above a certain severity level for causing certain data to be saved within said storage device in a file location appropriate for such data,
    wherein said system notifies a user when said determined motion anomaly condition is at a warn level but below said certain severity level.

2. The system of claim 1 wherein said sensor is networked with a plurality of computer systems.

3. The system of claim 1 wherein said sensor includes processing by said processor.

4. The system of claim 1 wherein said computer further includes:
    a service processor working in conjunction with said processor, said service processor working in conjunction with said sensor to control the saving of said data.

5. The system of claim 1 wherein said sensor is located remote from said computer system.

6. The system of claim 5 wherein said remote sensor is at another computer system.

7. The system of claim 1 wherein said certain data includes in-process data.

8. The system of claim 7 wherein said storage device is within the same housing as said processor.

9. The system of claim 1 wherein said sensor can determine degrees of fault, and wherein said processor takes different action depending upon a determined fault degree.

10. The system of claim 9 wherein said processor action is selected from the list of: notification of a user; internal storage of in-process data; external storage of in-process data; external storage of other data previously stored in said storage device.

11. A method for use in a computer system protecting in-process data in the event of a motion anomaly; said method comprising the steps of:
    processing data in and out of a volatile memory;
    determining when said computer system is being subjected to a motion anomaly;
    processing any said determined motion anomaly to determine the severity of said
    storing in a non-volatile memory any data not already stored in a non-volatile memory upon a determination that a said anomaly is above a certain severity level; and
    closing down the operation of said computer system after said storing step dependent upon the severity of said anomaly.

12. The method of claim 11 further including the step of receiving motion anomaly data from a remote location.

13. The method of claim 11 further comprising the step of sending determined motion anomaly data to at least one system remote from said computer system.

14. The method of claim 11 wherein said certain severity level is controllable by a user of said computer system.

15. The method of claim 11 further including the step of: providing at least one warning based on said determined severity level.

16. The method of claim 11 wherein said determining step includes monitoring a transducer for one or more of the following events:
    absolute motion level, comparison to outside motion levels, and comparison to prior operating motion levels.

17. The method of claim 11, said method further comprising:
    warning a user of said motion anomaly when said motion anomaly is at a warn level but below a certain severity level.

18. The method of claim 11 wherein said storing step includes writing said in-process data to a hard drive or other storage devices.

19. The method of claim 18 wherein said hard drive is located within a housing wherein said processing step is performed.

20. A data recovery system for use in a computer system comprising:

means for determining when a motion anomaly is occurring;

means, operative in response to said determining means, for storing in non-volatile storage any data not already in non-volatile storage when said motion anomaly is above a danger level, said storing being at a location appropriate for said data; and means for providing at least one warning to a user, wherein said warning is provided upon determination of an anomaly less severe than said anomaly that enables said storing means.

21. The system of claim 20 further comprising means for transmitting motion anomaly data to at least one remote location.

22. The system of claim 20 wherein said determining means includes:

at least one motion-dependent transducer; and a processor for controlling said storing means in response to signals for said transducer.

23. The system of claim 22 wherein said transducer is selected from the following:

absolute motion level, comparison to outside motion levels, comparison to prior operating motion levels.

24. The system of claim 22 further including:

means operative in response to said determining means for closing down the operation of said computer system after said storing means is enabled.

25. The system of claim 22 wherein said motion-dependent transducer is located remotely from said storage means.

* * * * *